US012298267B2

(12) United States Patent
Verdingovas et al.

(10) Patent No.: US 12,298,267 B2
(45) Date of Patent: May 13, 2025

(54) COATED STRUCTURE WITH A MONITORING SYSTEM, A METHOD FOR MONITORING CRACKING OF A COATED STRUCTURE, A COATING SYSTEM, AND A MONITORING SYSTEM

(71) Applicant: HEMPEL A/S, Kongens Lyngby (DK)

(72) Inventors: Vadimas Verdingovas, Kongens Lyngby (DK); Josep Palasi Bargallo, Kongens Lyngby (DK); Stefan Urth Nielsen, Kongens Lyngby (DK)

(73) Assignee: HEMPEL A/S, Kongens Lyngby (DK)

( * ) Notice: Subject to any disclaimer, the term of this patent is extended or adjusted under 35 U.S.C. 154(b) by 153 days.

(21) Appl. No.: 18/022,658

(22) PCT Filed: Aug. 31, 2021

(86) PCT No.: PCT/EP2021/073947
§ 371 (c)(1),
(2) Date: Feb. 22, 2023

(87) PCT Pub. No.: WO2022/043569
PCT Pub. Date: Mar. 3, 2022

(65) Prior Publication Data
US 2023/0324321 A1 Oct. 12, 2023

(30) Foreign Application Priority Data
Aug. 31, 2020 (DK) .......................... PA 2020 70563

(51) Int. Cl.
*G01N 27/20* (2006.01)
*G01M 5/00* (2006.01)
(Continued)

(52) U.S. Cl.
CPC ........ *G01N 27/205* (2013.01); *G01M 5/0033* (2013.01); *G01N 17/04* (2013.01);
(Continued)

(58) Field of Classification Search
CPC ........ G01N 17/02; G01N 17/04; G01N 27/02; G01N 27/026; G01N 27/20; G01N 27/205; G01N 27/24; G01N 27/82; G01M 5/0033

See application file for complete search history.

(56) References Cited

U.S. PATENT DOCUMENTS 3,803,485 A * 4/1974 Crites .................. G01N 27/205
73/104
4,484,132 A 11/1984 Crites
(Continued)

FOREIGN PATENT DOCUMENTS

CN 104073758 A 10/2014
CN 105783697 A 7/2016
(Continued)

OTHER PUBLICATIONS

International Search Report from PCT Application No. PCT/EP2021/073947, Dec. 20, 2021.
(Continued)

*Primary Examiner* — Steven L Yeninas
(74) *Attorney, Agent, or Firm* — Workman Nydegger

(57) ABSTRACT

A coated structure with a monitoring system includes a base having a base surface, a coating system having one or more layers of cured coat providing protection against surface degradation and being joined to the base surface in a base interface and extending in a thickness direction to an outer coating surface, at least one electrode made from a conductive material embedded in the coating system. The monitoring system is configured to generate an input signal in the at least one electrode and to read an output signal from the at least one electrode, and from the output signal, to determine cracking of the one or more layers of cured coat.

22 Claims, 10 Drawing Sheets

(51) Int. Cl.
  *G01N 17/04* (2006.01)
  *G01N 27/02* (2006.01)
  *G01N 27/24* (2006.01)
  *G01N 27/82* (2006.01)

(52) U.S. Cl.
  CPC .......... *G01N 27/02* (2013.01); *G01N 27/026* (2013.01); *G01N 27/24* (2013.01); *G01N 27/82* (2013.01)

(56) References Cited

U.S. PATENT DOCUMENTS

| | | | |
|---|---|---|---|
| 5,859,537 | A | 1/1999 | Davis et al. |
| 9,970,841 | B2 * | 5/2018 | Taillade .............. G01M 5/0083 |
| 2009/0128169 | A1 | 5/2009 | Fay et al. |
| 2010/0308849 | A1 | 12/2010 | Bouteiller et al. |
| 2011/0169704 | A1 | 7/2011 | Ajayan et al. |
| 2013/0001090 | A1 | 1/2013 | Rubinson et al. |
| 2015/0377814 | A1 | 12/2015 | Schindelholz et al. |
| 2016/0027993 | A1 | 1/2016 | Wang et al. |
| 2019/0330054 | A1 | 10/2019 | Ackermann et al. |
| 2020/0141890 | A1 | 5/2020 | Marya et al. |
| 2020/0191702 | A1 | 6/2020 | Williams et al. |
| 2022/0146446 | A1 * | 5/2022 | Okazaki .................. H01B 3/02 |

FOREIGN PATENT DOCUMENTS

| | | |
|---|---|---|
| CN | 106522089 A | 3/2017 |
| CN | 110412763 A | 11/2019 |
| CN | 111337209 A | 6/2020 |
| JP | 2005181109 A | 7/2005 |
| JP | 2006317350 A | 11/2006 |
| WO | 2011076856 A1 | 6/2011 |
| WO | 2014032844 A1 | 3/2014 |

OTHER PUBLICATIONS

Search Report from Danish Application No. PA202070563, Feb. 9, 2021.

Su et al., "Application of Embedded Sensors in the Thermal Cycling of Organic Coatings," Corrosion Science, vol. 50., Jun. 17, 2008, pp. 2381-2389.

Amirudin et al., "Application of Electrochemical Impedance Spectroscopy to Study the Degradation of Polymer-Coated Metals," Progress in Organic Coatings System, vol. 26, May 30, 1995, pp. 1-28.

Mansfeld et al., "Determination of Coating Deterioration with EIS, I. Basic Relationships," Corrosion, vol. 47, No. 12., Dec. 1, 1991, pp. 958-963.

Kang et al., "Multi-Channel Electrical Impedance-Based Crack Localization of Fiber-Reinforced Cementitious Composites under Bending Conditions," Applied Sciences, vol. 8, No. 12, Dec. 12, 2018, 1-13 pages.

Kittel et al., "New Methods for the Study of Organic Coatings by EIS New Insights into Attached and Free Films," Process in Organic Coatings, vol. 41, As Early As Mar. 1, 2001, pp. 93-98.

Merten et al., "Re-Evaluating Electrochemical Impedance Spectroscopy (EIS) for the Field Inspector's Toolbox: A First Approach," US Bureau of Reclamation, Research and Development Office. Science and Technology Program, Materials Engineering and Research Laboratory, As Early As Jan. 1, 2014, 13 pages.

Pour-Ghaz et al., "Using Electrical, Magnetic and Acoustic Sensors to Detect Damage in Segmental Concrete Pipes Subjected to Permanent Ground Displacement," Cement & Concrete Composites, vol. 33, No. 7, Apr. 16, 2011, pp. 749-762.

International Preliminary Report on Patentability from PCT Application No. PCT/EP2021/073947, Dec. 5, 2022.

* cited by examiner

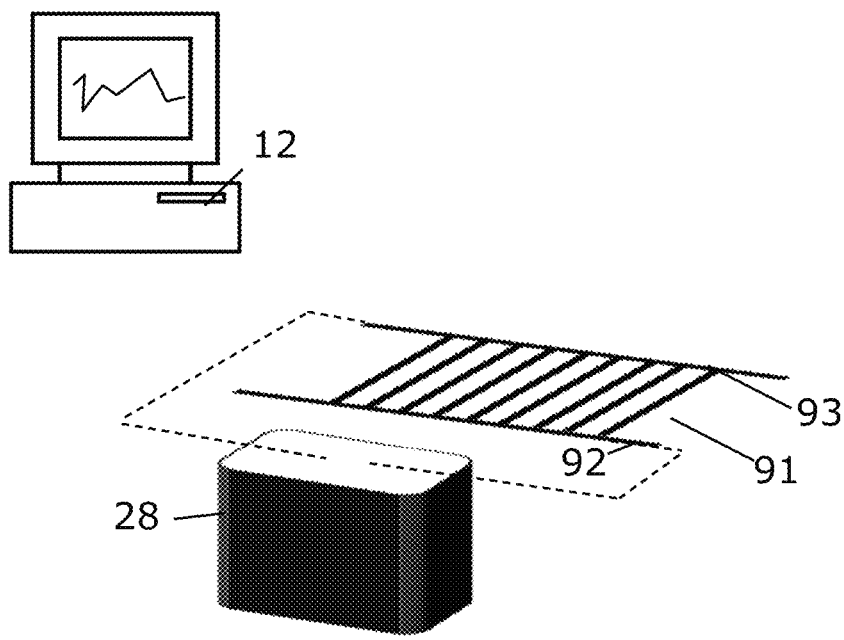
Fig. 9
 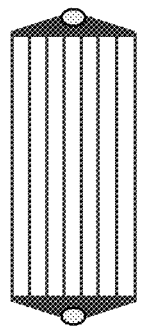    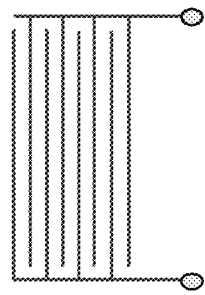
Fig. 10a  Fig. 10b     Fig. 11a  Fig. 11b

COATED STRUCTURE WITH A MONITORING SYSTEM, A METHOD FOR MONITORING CRACKING OF A COATED STRUCTURE, A COATING SYSTEM, AND A MONITORING SYSTEM

INTRODUCTION

The disclosure relates to a coated structure comprising a base having a base surface, a coating system joined to the base surface in a base interface and extending in a thickness direction to an outer coating surface.

An electrode is embedded in the coating system, and the monitoring system is arranged for communicating an input signal and an output signal with the electrode. The monitoring system can determine cracking of the cured coat based on the output signal.

BACKGROUND

A large variety of structures made e.g. of steel or concrete are covered with a coating system comprising one or more layers of a "cured coat". The cured coat may serve different purposes, inter alia protection against atmospheric degradation including corrosion, fading, and UV-caused degradation etc., reduction of fouling, abrasion resistance, chemical resistance, prevention of reflection, or simply providing an aesthetic appearance.

Under ideal conditions, the coating system exhibits a predefined, intended property, e.g. a specific level of protection against ingress of air, water, or corrosive species, and it therefore preserves the intended condition of the structure. Over time, cracks, or coating degradation, i.e. defects or changes in the one or more layers of cured coat reduce the intended effect, and scheduled maintenance or repair may be necessary.

Different sensor principles exist for determining cracking of the steel or concrete structure.

Cracking can be caused by external factors such as mechanical impact, temperature, exposure to chemicals including water, intercoat adhesion problems between layers of cured coats, and fatigue conditions etc, or cracking can be caused by internal factors such as internal stress during application and/or fatigue of the coating during the lifetime of the coated structure.

Cracking could be determined as expressed e.g. in the article "*Multi-Channel Electrical Impedance-Based Crack Localization of Fiber-Reinforced Cementitious Composites under Bending Conditions*", by Man-Sung Kang, Hanju Lee, Hong Jae Yim, Yun-Kyu An and Dong Joo Kim; published by Applied Sciences MDPI, 2018.

Embedding conductive electrodes between coating layers is a known principle for detecting barrier properties of the coating and/or corrosion on the surface of the underlying structure. See for example Kittel et al., Progress in Organic Coatings (2001), 41: 93-98; Su et al., Corrosion Science (2008), 50: 2381-2389; and US2015377814A.

The use of electrical impedance spectroscopy to detect cracks on the surface of concrete is known from literature (Pour-Ghaz et al., Cement & Concrete Composites (2011) 33: 116-123; and Kang et al., Appl. Sci. (2018), 8: 2582).

There remains a need for reliable methods for monitoring cracking of coating layers when visual inspection of the coating is inconvenient or costly.

SUMMARY

It is an object to improve the ability to monitor a coated structure and particularly to identify cracking in one or more layers of a cured coating system.

According to these and other objects, the disclosure in a first aspect provides a coated structure with a monitoring system configured to exchange electrical signals with the electrode and determine cracking from the signals.

Herein, the term "embedded" means that the at least one electrode is bonded completely to the coating system. "Completely bonded means that opposite inner and outer surface portions of the electrode are bonded to the coating system and both opposite surfaces of the electrically conductive material is thereby in direct contact with and adhered to the coating. This makes the electrode behave like being part of the coating system. In that way it is ensured that cracking of one or more of the one or more layers of cured coat at a position of the electrode also amends or breaks the electrode and that increases the ability to identify cracking of the cured coat.

When used herein, the term "coated structure" is a structure comprising a base and a coating system applied on the surface of the base. The coating system may comprise one or more layers of cured coat, e.g. a first layer of cured coat and a second layer of cured coat obtained by application of identical and/or different coating compositions. Each layer comprises opposite inner and outer surfaces, the inner surfaces being joined in a coating system interface. The outer surface of the first layer may e.g. be joined to the base in the base interface.

The coated structure comprises at least one electrode embedded in the coating system, i.e. in a layer of cured coat or between more layers of cured coats. The monitoring system is configured for determining cracking based on signals in the at least one electrode, and it may particularly comprise a computer system.

In one embodiment the electrode may be embedded in (inside) a single layer coat meaning embedment in a coating composition in which no coating layer interface can be identified, e.g. a coating obtained by two applications without letting the first application cure completely before applying an electrode and the next layer, i.e. wet on wet application. The coating system then comprises at least one layer of cured coat obtained by at least two passes, i.e. applications of the same coating composition wherein one or more electrodes are embedded in between the at least two applications. In such an embodiment, the electrode has been arranged on top of one or more "first" applications without allowing the coating obtained by the first applications to cure and subsequently one or more "second" applications are applied, and the coating made up by the at least two applications is allowed to cure.

In another embodiment, the electrode is embedded between two adjacent layers of cured coat, that is when there is a distinct interface between two coating layers. This may e.g. be obtained when the first layer has been allowed to cure before application of the electrode and a second layer, or this may be obtained e.g. when the two layers are of different compositions. In this case the coating system, comprises at least two layers of cured coat joined in a coating interface and forming an adhesive inter coating bond strength. In one embodiment, at least one of the at least one electrode is located in the coating interface and forms an adhesive electrode bond strength to both layers of cured coat.

In one embodiment, the at least two layers of cured coat are obtained from the same coating composition, particularly these two layers of cured coat could be on opposite sides of one of the at least one electrode.

Alternatively, the at least two layers of cured coat are obtained from different coating compositions, particularly these two layers of cured coat could be on opposite sides of one of the at least one electrode.

Embedment of an electrode between two cured coats can be obtained by application of the electrode material on the first cured coat for example as a printed pattern made from a conductive ink, or by application of the electrode material on the first non-cured coat for example by transferring from a carrier material, e.g. by arranging a pattern of conductive material on a carrier material, e.g. a substrate of paper or film etc., and transferring the pattern to the first application. The carrier material can subsequently, be peeled off when the electrode bonds to the coat of the first application. Typically, the transfer of the pattern may take place before the coat of the first application is completely cured, and by curing the first coat with the electrode on top, the electrode becomes bonded to the coat and the substrate of paper or film can be peeled off.

Subsequently a second coating layer is applied to form a second cured coat. The second coating layer is typically applied within the recoating interval specified for the coating.

In one embodiment, at least one electrode is configured to break essentially simultaneously with one or more of the one or more layers of cured coat during elongation of the coated structure. By essentially is meant e.g. within a time difference of not more than 48 hours such as less than 24 hours or even less than an hour or less than a minute.

The at least one electrode may, alternatively, be configured to break at the earliest simultaneously with one or more of the one or more layers of cured coat during elongation of the coated structure. In this embodiment, the at least one electrode may break later than the cured coat. Due to the specific configuration of the electrode, electrical signal reading from an unbroken electrode is facilitated in a time period extending across a point in time where the cured coat cracks, and the ability to consistently detect cracks increases.

The specific configuration may be obtained e.g. by the at least one electrode being provided with an elongation at break which is essentially equal to or higher than the elongation at break of one or more of the one or more layers of cured coat. Essentially equal means with a variation of less than 10 percent.

Herein, "elongation at break" means a property of the material defining the ratio between changed length and initial length at the point where the material breaks. It therefore expresses the capability of a material to resist changes of shape without crack formation. Accordingly, when used herein, the elongation at break means that elongation at break obtainable by the specific electrode compared with the cured coat. The elongation at break of the electrode is a result inter alia of the material properties, the geometry, and the thickness of the electrode. The elongation at break of the cured coat is a result inter alia of the material properties and the thickness of the cured coat.

In one embodiment, the electrode is made from a material having an expansion coefficient being essentially equal to the expansion coefficient of the cured coat. Essentially equal means with a variation of less than 10 percent.

When used herein, the term "expansion coefficient" is the tendency of matter to change its shape, area, volume, and density in response to a change in temperature, excluding changes appearing in response to phase transition.

The thermal expansion may be given by the equation:

$$\alpha = \frac{1}{V}\left(\frac{\delta V}{\delta T}\right)_P$$

Where P indicates a constant pressure during the expansion, V indicates volumetric rather than linear expansion.

If the expansion coefficients for the at least one electrode and the cured coat are essentially equal, the thermal expansion influences the shape, area, volume, or density of the cured coat equally, and the electrode may respond more consistently to temperature variations and the ability of the system to detect cracks may improve.

The at least one electrode may further have a modulus of elasticity being essentially equal to the modulus of elasticity of the cured coat. The electrode may be able to stretch more than the coating system but not too much since it may be desirable to ensure that the electrode cracks eventually, i.e. when the crack in the coating or base exceeds a certain limit. For that reason, "essentially equal" means with a variation of less than 10 percent.

When used herein, the term "modulus of elasticity" is a measure of resistance against elastic deformation, e.g. as expressed by Youngs modulus (E).

Since the modulus of elasticity is essentially equal for the at least one electrode and the cured coat, the electrode becomes more adaptive to variations in shape, area, volume, or density, thus similar to that of the cured coat. Accordingly, the electrode may become less prone to cracking, and therefore more consistently respond to cracking in the cured coat.

When used herein, a "cured coat" indicates a coat obtained by applying a coating composition to a surface and allowing the composition to cure. A cured coat may be obtained from application of one or more layers of a coating composition to obtain the desired thickness of the cured coat.

The term "cured coat" is used as a general term covering all types of curing such as for example curing obtained by crosslinking of a binder and a curing agent in a two-component coating system, curing obtained by evaporation of organic solvent or water (also called physically drying) with or without heating, and curing obtained by other means such as by radiation curing.

When used herein, a "coating composition" indicates a coating composition ready to be applied to a surface.

The monitoring system may comprise an I/O device configured to generate an input signal in the electrode and to read an output signal from the electrode.

A data logger may be configured to log the output signal from the I/O device, and a computer unit may be configured to use the logged signal from the data logger and to determine cracking.

In one embodiment, the data logger is constituted by the computer unit itself, in another embodiment, the data logger is constituted by the I/O device, and in one embodiment, it is a separate unit.

The I/O device communicates the input and output signal with the electrode based on a known principle, e.g. based on electrochemical impedance spectroscopy (EIS) and using e.g. an AC signal. For more information related to EIS, reference is made to for example "*Application of electrochemical impedance spectroscopy to study the degradation of polymer-coated metals*" by A. Amirudin, D. Thieny, Progress in Organic Coating system, volume 26(1):1-28; "*Determination of Coating system Deterioration with EIS*", F. Mansfeld, C. H. Tsai, Corrosion, 1991, Vol 47 (12): 958-963; "*Re-evaluating Electrochemical Impedance Spectroscopy (EIS) for the Field Inspector's Toolbox: A First Approach*"; B. J. Merten, A. Skaja, D. Tordonato, D. Little published in United States, Bureau of Reclamation, Research and Development Office. Science and Technology Program, Materials Engineering and Research Laboratory (U.S.) 2014; These and several other publications explain the principles of determining deterioration e.g. by use of EIS.

The communication may use a cabled connection between the I/O device and the electrode, or the communication may be wireless, e.g. by induction, RFID etc.

The base may e.g. be an item made of steel, carbon fibres, composite materials, or concrete, e.g. part of a ship, a pipe, a bridge, a wind blade, an airplane, a car, or any similar kind of structure for which coating system systems are typically used to protect against degradation or to improve appearance.

The base surface is an outer surface of the base, and it is the surface onto which the coating system is applied.

The base interface is the interface between the coating system and the base. It is typically a sensitive part of the structure and delamination where the coating system separates from the base surface may cause cracking of the coating system and rapid degradation of the base. Particularly, degradation at the base interface may be difficult to identify if the coating system as such is intact.

When used herein, the term "thickness direction" refers to the direction from the base surface to the outer coating system surface and perpendicular to the base surface. This constitutes the thickness of the coating system.

The one or more cured coats may e.g. comprise the following binders: Acrylic, epoxy, polyaspartic, polyurethane, polysiloxane, alkyd, silicate, silicone, polyurea Hybrid technologies: epoxy/acrylic, epoxy/siloxane, epoxy/silicates.

The one or more cured coats may comprise one or more pigments, e.g. providing colour or constituting filler material. Any colour of the pigment may be considered, e.g. yellow, orange, red, violet, brown, blue, green, or black which are part of the official pigment numbering system e.g. described as pigment white xxx (x=1 to 999), pigment yellow xxx (x=1 to 999), pigment orange (x=1 to 999), pigment red xxx (x=1 to 999), pigment brown (x=1 to 999), pigment violet (x=1 to 999), pigment green (x=1 to 999), pigment blue P.B. (x=1 to 999), pigment black (x=1 to 999) or the like.

Examples of such pigments are: zinc oxide, zinc containing phosphate and polyphosphate, aluminium containing phosphate, zinc borate, graphite, carbon black oxide, coated mica, fluorescent pigments, cuprous oxide, aluminium paste pigment (leafing and non-leafing type), metallic pigments, zinc dust, organic pearl pigment, ammonium polyphosphate, coloured silica sand, polyacrylic acid/calcium carbonate, azo-, phthalocyanine and anthraquinone derivatives (organic pigments), and titanium dioxide (titanium(IV) oxide), etc.

The coating system may e.g. comprise one or more fillers selected from for example: Carbonates such as: Calcium carbonate, calcite, dolomite (=calcium/magnesium carbonate), magnesium silicate/carbonate, polycarbonate. Included are also mixtures, calcined grades and surface treated grades. Silicates such as: Aluminium silicate (kaolin, china clay), Magnesium silicate (talc, talc/chlorite), Potassium Aluminium silicate (plastorite, glimmer), Potassium Sodium Aluminium silicate (nepheline syenite), Calcium silicate (wollastonite), Aluminium silicate (bentonite), phyllo silicate (mica). Oxides: Silicon dioxide such as quartz, diatomite, metal oxides such as calcium oxide, aluminium oxide. Hydroxides/hydrates such as: Aluminium hydroxide, Aluminium trihydrate, Sulphates: barium sulphate. Other fillers: Barium metaborate, silicon carbide, Perlite (volcanic glass), Glass spheres (solid and hollow), glass flakes, glass and silicate fibres, organic fibres, polyvinylidene chloride acrylonitrile, polystyrene acrylate.

Included are also mixtures of the above fillers as well as grades which are natural, synthetic, calcined or surface treated.

The coating system could comprise several layers of paint, e.g. including a primer, e.g. an anticorrosive primer applied to the base surface. The base surface could, initially, be treated e.g. by abrasive blasting. On top of one or more layers of primer, the coating system may include one or more layers of Tie-coat or intermediate coat, and/or one or more layers of a top coat. The top coat could e.g. comprise one or more layers of a fouling control surface coating system, which is particularly useful for marine structures. Additionally, one or more layers of a tie-coat could be applied under the top coat.

The anticorrosive primer could for example be an epoxy-type anticorrosive primer, and it may be a zing containing or zinc-free primer. An example of an anticorrosive primer can be found inter alia in the patent publication WO 2014/032844. The tie-coat could also be an epoxy, silicone, or polyurethane based tie-coat. The fouling control surface coating system may e.g. comprise one or more antifouling coats, or a silicone system, where the silicone system can comprise similar or different layers of silicone coating systems. An example of a suitable top coat for fouling control can be found inter alia in the patent publication WO 2011/076856.

The electrode material may particularly have mechanical properties comparable to the coating system, especially elongation at break should be higher or equivalent to the coating system, adhesive bond strength should be higher or equivalent to the coating system. It may also fulfil service temperature and corrosion resistance requirements linked to specific application of coating system.

The at least one electrode is made from a conductive material. Said conductive material may comprise a conductive flexible polymer or polymer blend such as for example poly(3,4-ethylenedioxythiophene) polystyrene sulfonate (PEDOT:PSS), Polypyrrole (PPy), polyphenylene vinylene (PPV), polyacetylene, or Polyaniline (PANI).

Alternatively, said conductive material may comprise a non-conductive flexible polymer e.g. a conventional polymer or polymer blend for coating systems comprising a conductive dopant made of for example a metal like silver, copper, aluminium, iron, zinc; or a conductive dopant made of elements from the carbon family including graphene, graphite, carbon nanotubes etc. Combinations of conductive flexible polymers and non-conductive flexible polymers with or without a dopant may also be used.

The computer unit may be configured for determining an electrical resistance in the at least one electrode and for using the resistance for determining cracking of the coating. This may be carried out by determining the temperature adjusted electrical resistance of one of the electrodes shortly after the coated structure is made and store that resistance as a reference resistance. Throughout the lifetime of the coated structure the resistance of that electrode can be compared with the reference resistance and if the difference exceeds a threshold, it can be considered as an indication of cracking in the coating system. Resistance based determining of cracking may be based on an AC signal or a DC signal.

The coating system may comprise at least two electrodes, particularly two embedded electrodes. Two electrodes enable capacitance measurement and use of EIS. Decrease of active surface area of the electrode due to breaking of conductors as crack propagates through the coating and conductor would be seen as decrease of capacitance which, similar as in resistance measurements, will be considered as an indication of cracking in the coating system. Alternatively, or additionally, if the cured coat cracks, the distance between the at least two electrodes may change, and that distance change can change the capacitance.

Capacitance-based or EIS-based determining of cracking may be based on an AC signal frequency e.g. measured in the range of frequencies from 1 kHz to 100 kHz.

When at least two electrodes are used, the electrodes are spatially separated. The term "spatially separated" means that the electrodes are not in direct electrically conductive contact with each other, since they are separated e.g. by air, cured coat, or other dielectric matter.

In a second aspect, the disclosure provides a method of detecting cracking in a cured coat covering a surface of a base. The method comprises:

embedding at least one electrode in a cured coat and/or between one or more layers of cured coat;
generating an input signal in the at least one electrode; and
using a monitoring system to read an output signal from the at least one electrode and based thereon to determine cracking of the cured coat.

The at least one electrode is designed to break at the earliest simultaneously with said one or more layers of cured coat during elongation of the coated structure.

Cracking may be determined by determining an increased resistance caused by at least partial destruction of the at least one electrode or determined by determining a changed capacitance caused by destruction of the at least one electrode and/or determined by EIS. Resistance based sensing may use an AC or a DC signal whereas the capacitance and EIS based sensing may use an AC signal.

The method may include any steps implicit in view of the coated structure according to the first aspect of the disclosure.

In a third aspect, the disclosure provides a coating system for protecting a structure with a base. The coating system comprising one or more layers of cured coat, wherein an electrode is embedded in at least one of said one or more layers of cured coat and/or between two or more layers of cured coat, wherein the cured coat bonded to the electrode exhibits a first elongation at break, and the electrode exhibit a second elongation at break, wherein the first elongation at break is at most equal to the second elongation at break such that the electrode is configured to break at the earliest simultaneously with the cured coat during elongation of the coated structure.

The coating system may comprise two or more layers of cured coat, wherein a) an electrode is embedded in at least one of the two or more layers of cured coat, wherein the cured coat in which the electrode is embedded exhibits a third elongation at break, and the electrode embedded in the at least one of the two or more layers of cured coat exhibits a fourth elongation at break, wherein the third and fourth elongation at break are essentially equal such that the electrode embedded in the at least one of the two or more layers of cured coat is configured to break essentially simultaneously with or at the earliest simultaneously with the cured coat during elongation of the coated structure.

and/or b) an electrode is embedded between at least two of the two or more layers of cured coat, wherein at least one of the two or more layers of cured coat exhibits a fifth elongation at break, and the electrode embedded between at least two of the two or more layers of cured coat exhibits a sixth elongation at break, wherein the fifth and sixth elongation at break are essentially equal such that the electrode embedded between at least two of the two or more layers of cured coat is configured to break essentially simultaneously with or at the earliest simultaneously with at least one of the cured coat during elongation of the coated structure.

The coating system may comprise a plurality of different layers of cured coat and a plurality of different types of electrodes, each layer of cured coat having an associated type of electrode such that the associated electrode when embedded in or between the one or more layers of cured coat breaks at the earliest simultaneously with the cured coat during elongation of the coated structure.

The coating system may include any features implicit in view of the coated structure according to the first aspect of the disclosure or in view of the method according to the second aspect of the disclosure.

In a fourth aspect, the disclosure provides a monitoring system for a coated structure. The monitoring system comprises at least one electrode configured to be embedded in a coating system comprising one or more layers of cured coat covering a base, and a monitoring system configured to generate an input signal in the at least one electrode and to read an output signal from the at least one electrode, and from the output signal, to determine cracking of the cured coat, wherein the at least one electrode is designed to break at the earliest when elongated 10 pct.

The monitoring system may include any features implicit in view of the coated structure according to the first aspect of the disclosure, in view of the method according to the second aspect of the disclosure, or in view of the coating system according to the third aspect of the disclosure.

LIST OF DRAWINGS

In the following, embodiments will be described in further details with reference to the drawing in which:

FIG. 9 illustrates an electrode with a plurality of conductors;

Figure 18:
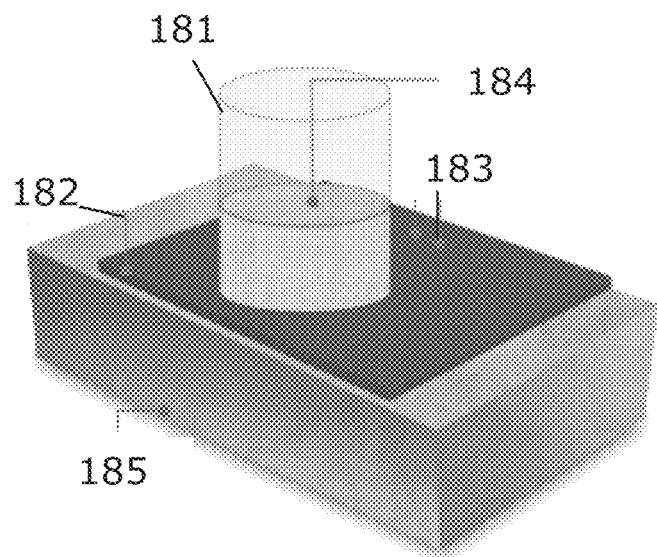
Figure 19:
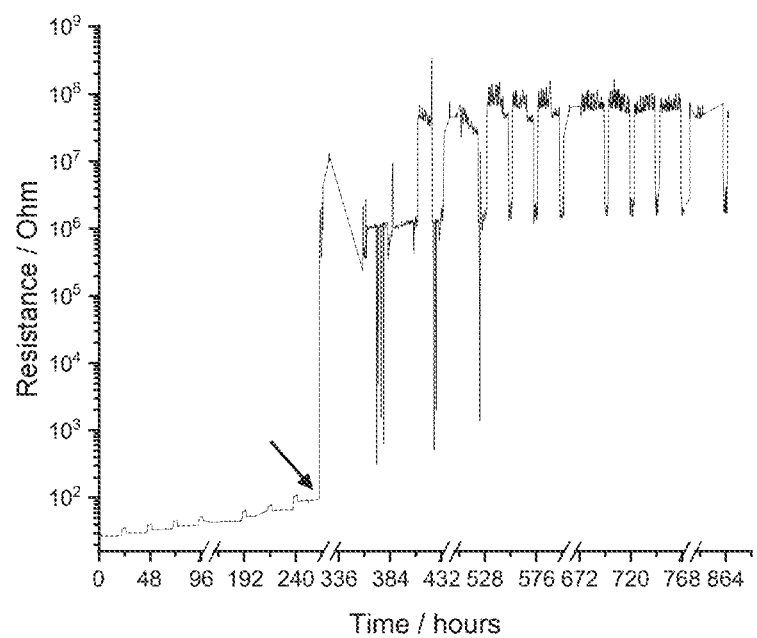
Figure 20:
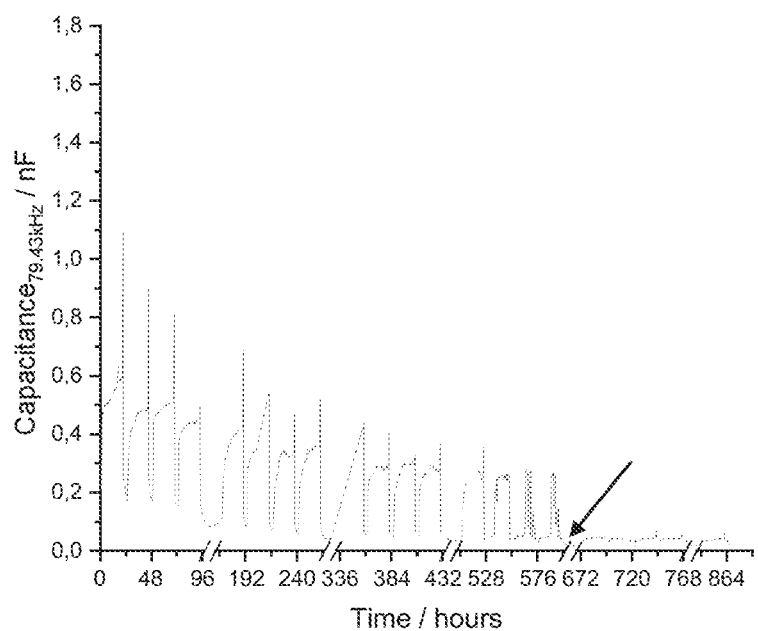
Figure 21:
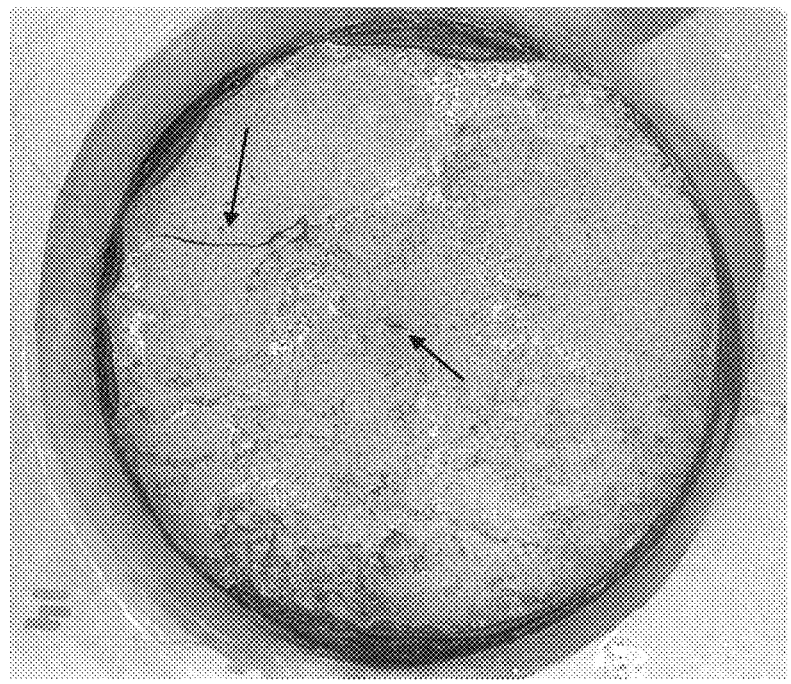

FIG. 18 illustration of test setup for cycling CUI test;

FIG. 19 illustrates time response of the resistance-based crack sensor to the cycling CUI test conditions, with the failure manifesting as significant increase of resistance;

FIG. 20 illustrates time response of the capacitance-based crack sensor to the cycling CUI test conditions, with the failure manifesting as a decrease of capacitance; and FIG. 21 illustrates optical macrograph of the test panel after the cycling CUI test showing several cracks propagated though the coating.

DESCRIPTION OF EMBODIMENTS

Detailed description and specific examples, while indicating embodiments, are given by way of illustration only. Various changes and modifications within the spirit and scope of the disclosure will become apparent to those skilled in the art from this detailed description.

Figure 1:
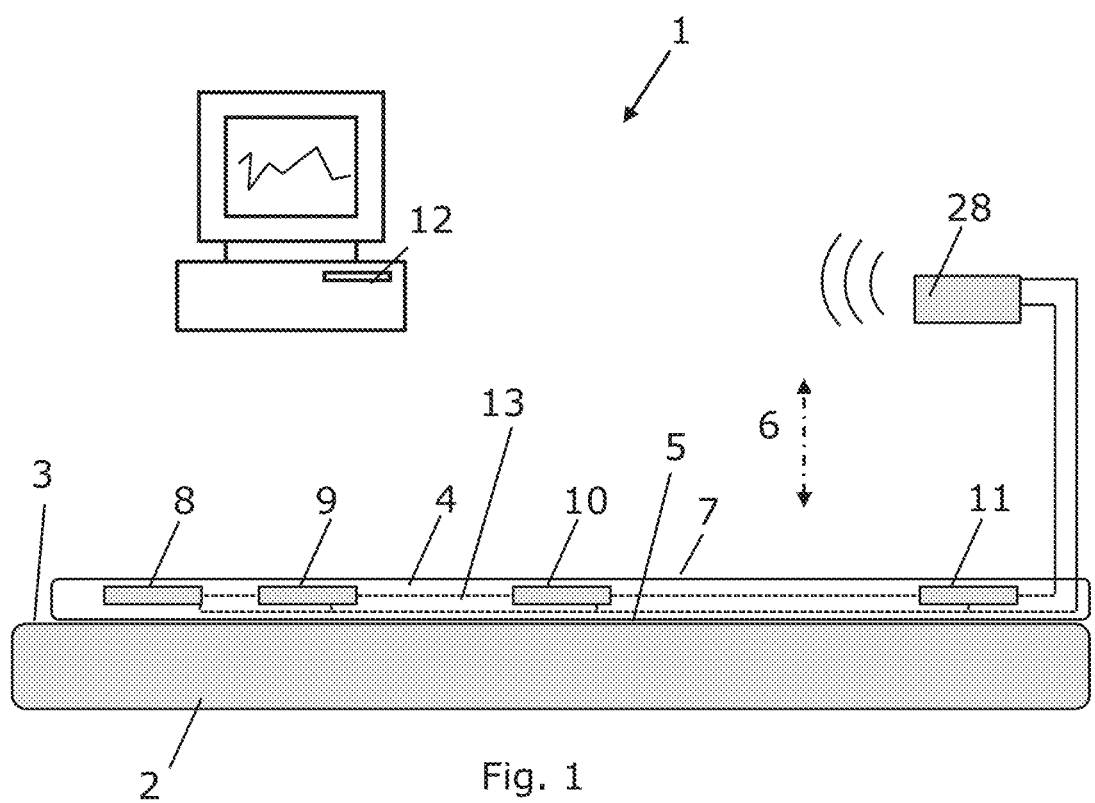
FIG. 1 illustrates a coated structure, electrodes embedded in the cured coat, and a monitoring system communicating with the electrodes to detect cracks.

FIG. 1 illustrates a coated structure 1 with a monitoring system. The coated structure comprises a base 2 made for example of steel. The base has a base surface 3 which is protected by a coating system comprising one or more layers of cured coat 4. The cured coat is joined to the base surface in a base interface 5, and the cured coat extends in a thickness direction illustrated by the arrow 6 and thereby forms a thickness of the cured coat. The cured coat forms an outer coating surface 7 facing away from the base 2.

Four electrodes 8, 9, 10, 11 are embedded in the coating system in or between one or more layers of cured coat (not indicated). The electrodes are illustrated relatively thick compared to the thickness of the cured coat. In practice they are much thinner than the cured coat. The cured coat may have a thickness of at least 100 times the thickness of the electrodes.

The potentiostat 28 communicates a DC signal or an AC signal with the electrode by inducing a signal into the electrode and reading an output signal from the electrode. The potentiostat forms a I/O device which, as illustrated, could be in wired connection with the electrodes, via the wire 13, or they could, alternatively, communicate a signal wirelessly with the electrodes, e.g. by induction of a current into the electrodes.

In FIG. 1, the potentiostat communicates wirelessly with the computer 12. The potentiostat and computer may, alternatively, be in wired communication. The potentiostat or alternative I/O structure and the computer together form a monitoring system configured to determine cracking of the cured coat based on the signal from the electrode.

Figure 2:
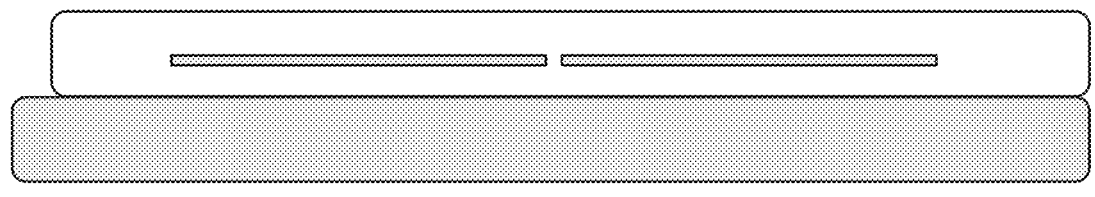
FIGS. 2-6 illustrate different cracking situations occurring in a coated structure with electrodes embedded in the cured coat.

If the cured coat is relatively elastic compared to the base, a situation may arise where the base and electrode cracks, but the cured coat has not cracked. FIG. 2 illustrates a situation which is not desirable, namely cracking of the electrode occurring without cracking of the coating system. In that case, the monitoring system may become unable to determine when the coating system cracks.

Figure 3A:
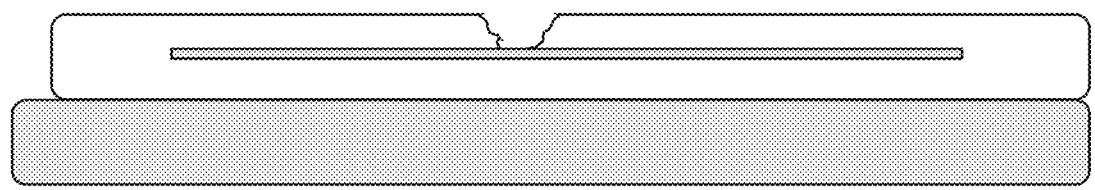
Figure 3B:
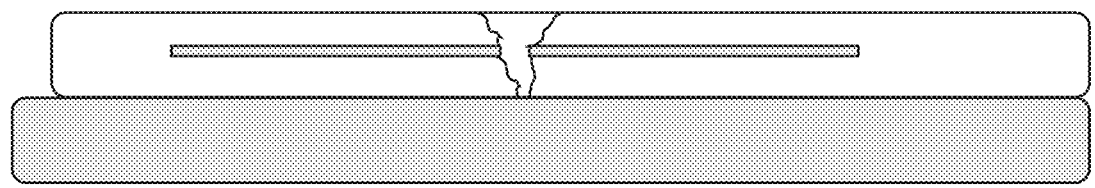

In FIG. 3a, the cured coat is cracked, and in FIG. 3b, the cured coat and the electrode is cracked.

In FIGS. 2, 3a and 3b the electrode is located inside one layer of cured coat.

Figure 4A:
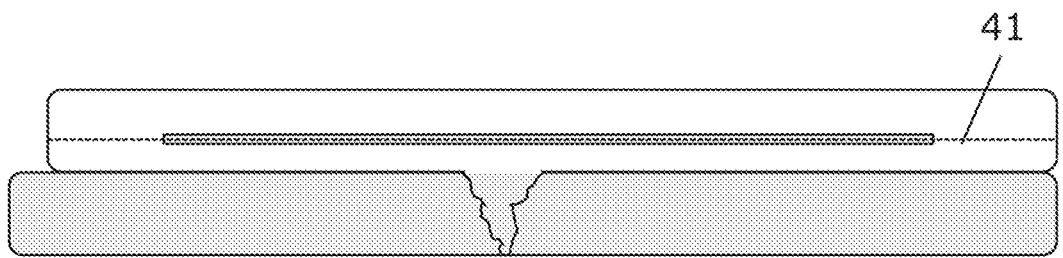

In FIG. 4a, the base has cracked, but the electrode is intact. The electrode is embedded in the coating and reacts only on cracks in the coating and not on cracks exclusively in the base.

Figure 4B:
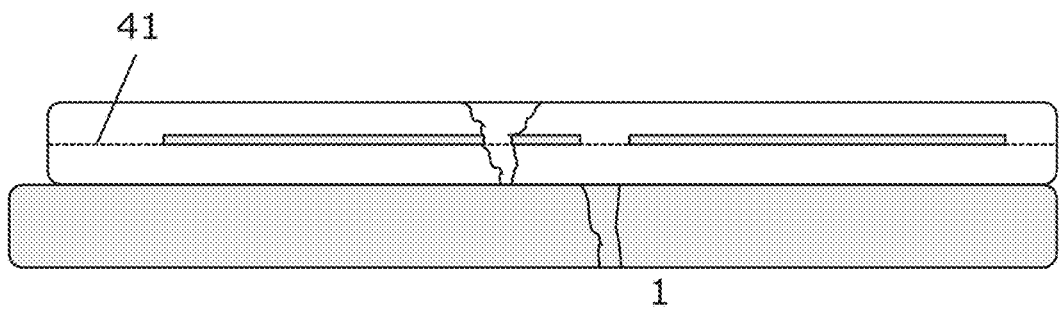

In FIG. 4b, both the base, the two layers of cured coat, and the electrode has cracked.

In FIGS. 4a, 4b, 5a, 5b and 6, the dotted lines 41 indicate an interface between two layers of cured coat and in the illustrated embodiments, the electrodes are in such interfaces.

Electrodes in one layer can be effective since a crack will need to cross all the layers before exposing the surface of the base to the environment.

Embedment with several electrodes in different levels above the base may allow the monitoring system to follow crack propagation, and enable a better understanding of the origin of the crack i.e. from the surface or from the base to the coating interface.

Figure 5A:
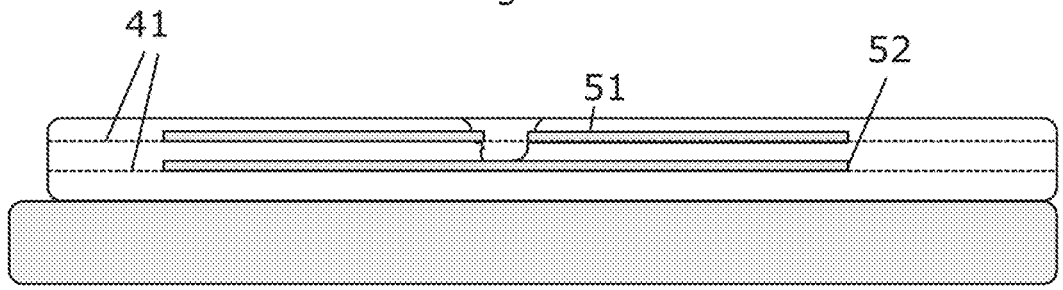
Figure 5B:
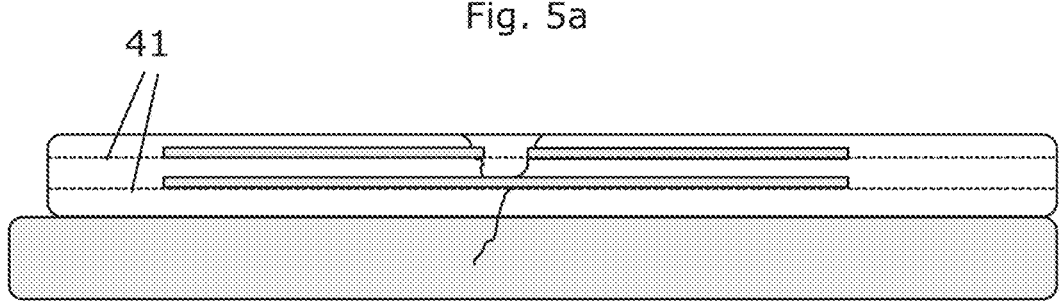
Figure 6:
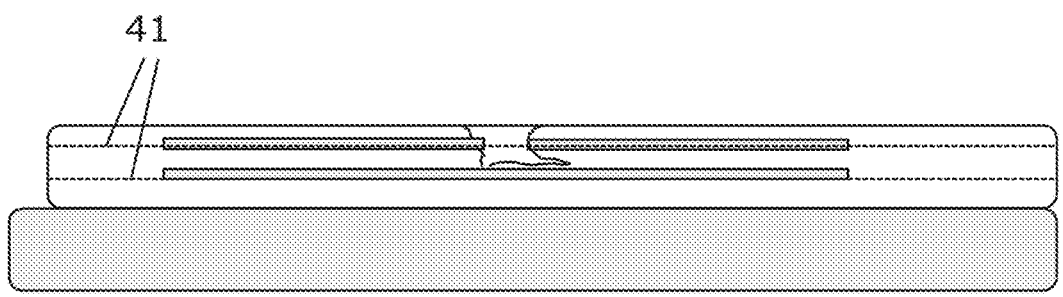

FIGS. 5a, b and FIG. 6 illustrate an embodiment where two electrodes are in different levels between cured coats. In FIG. 5a, the upper electrode 51 is broken due to the crack in the cured coat, but the lower electrode 52 has not yet started to break. In FIG. 5b, the crack propagates into the base.

FIG. 6 illustrates a situation where the crack propagates to the interface between two layers of cured coat and runs along the interface. Since the lower electrode is in the interface, the crack propagates along the electrode.

Figure 7:
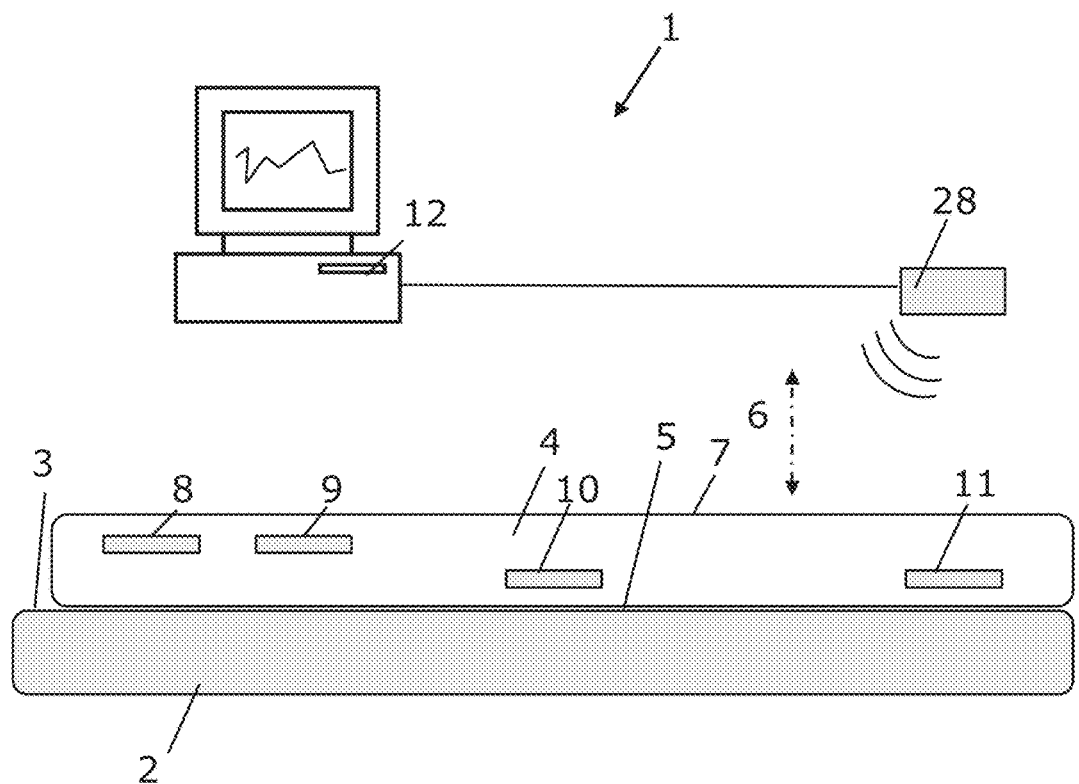
FIGS. 7-8 illustrate two different coated structures with electrodes embedded in different layers.

FIG. 7 illustrates an embodiment where the electrodes 8-11 are in different levels and offset perpendicular to the thickness direction.

Figure 8:
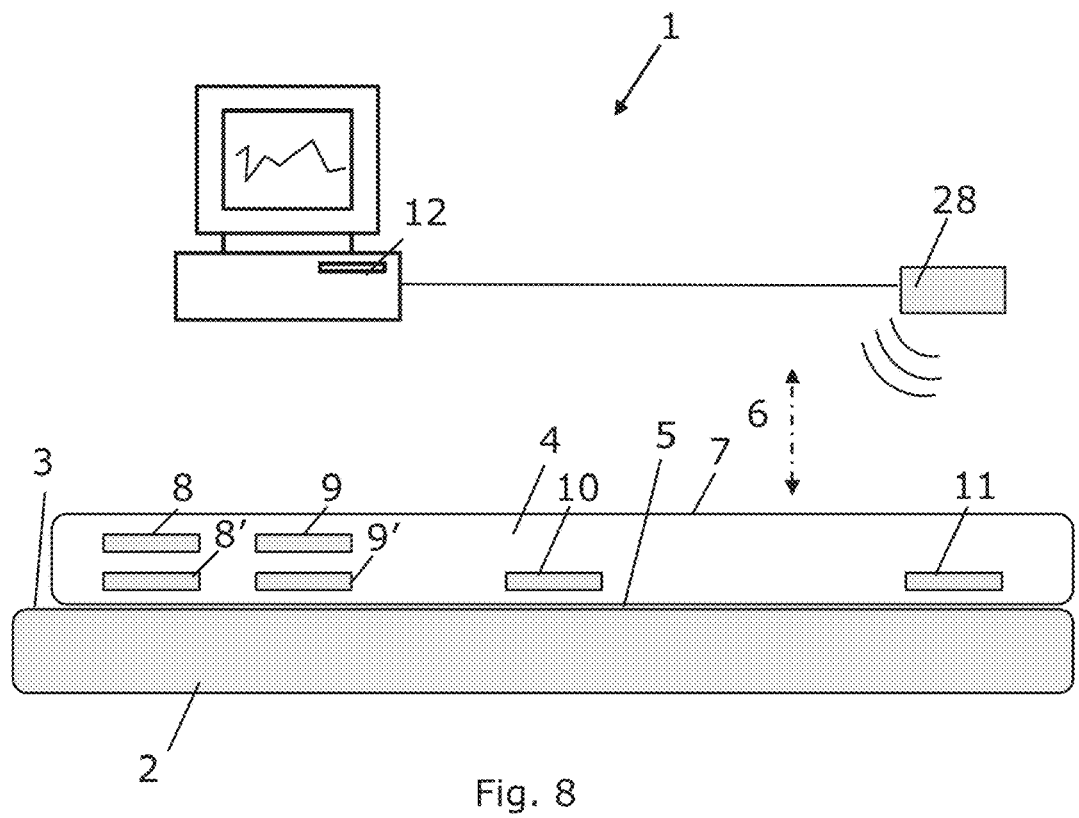

In FIG. 8, electrodes 8-9 are located above each other in different levels, and electrodes 10, 11 are located offset perpendicular to the thickness direction relative to the other electrodes.

FIG. 9 illustrates an electrode forming a plurality of conductors 91 extending individually between two connectors 92, 93. The potentiostat 28 is connected to the connectors 92, 93 a total resistance between the connectors can be calculated based on a contribution from each conductor.

The cracking can be identified by the computer in different ways as will be described in further details below.

Resistance based determining of crack relies on the relation between electrical resistance and geometry of the electrodes. In simple form, resistance of the electrode relates to specific resistance of the material of the electrode and the geometrical factor of the electrode:

$$R = \rho \frac{l}{S} \quad (1)$$

Where $\rho$ is specific resistance of the electrode material, l is the length of the electrode, S is cross-sectional area of the electrode. If the electrode is designed in such a manner that crack development in the cured coat changes the length of the electrode. If a crack propagates through the cured coat and the electrode, the crack will, eventually, break the electrode. This could be detected as a change of resistance in the electrode and can be illustrated in the following example in which the electrode comprises 10 parallel conductors. The electrode is illustrated in FIG. 10b. If the resistance of each parallel conductor is 1000 Ohm, the total resistance of the electrode can be calculated from eq. 2:

$$\frac{1}{R_{Total}} = \frac{1}{R_1} + \frac{1}{R_2} + \ldots \frac{1}{R_n} \quad (2)$$

for $n = 10$ conductors, a total resistance of the electrode would be $$R_{10} = \frac{1000}{10} = 100 \text{ Ohm}$$

If one of the conductors breaks, the total resistance of the electrode would be:

$$\text{for } n = 9, R = \frac{1000}{9} = 111 \text{ Ohm}$$

This means an increase of electrode resistance by 11 Ohm from its initial value of 100 Ohm. Consequent breaking of the conductors would result in more pronounced step of resistance increase, which will increase with reduction of number of conductors in the electrode. This can be seen from Table 1 below.

TABLE 1

| Number of conductors in electrode (remaining/initial) | Total resistance of electrode (Ohm) | Increase of electrode resistance from initial value (Ohm) |
|---|---|---|
| 10/10 | 100 | 0 |
| 9/10 | 111 | 11 |
| 8/10 | 125 | 25 |
| 7/10 | 143 | 43 |
| 6/10 | 167 | 67 |
| 5/10 | 200 | 100 |
| 4/10 | 250 | 150 |
| 3/10 | 333 | 233 |
| 2/10 | 500 | 400 |
| 1/10 | 1000 | 900 |
| 0/10 | ∞ | ∞ |

The step of resistance increase can be adjusted by changing the geometry and specific resistance of the electrode. Resistance measurement can be obtained via DC, pulsed, or AC measurement. Due to simplicity of this concept, both from measurement and data analysis point of view, this is method is attractive.

Capacitance based determining of crack relies on the relation between electrode geometry and measured capacitance value:

$$C = \varepsilon \varepsilon_0 \frac{A}{d} \qquad (3)$$

where $\varepsilon$ and $\varepsilon_0$ are accordingly the dielectric permittivity of the surrounding medium (cured coat) and vacuum, A and d is surface area and distance between electrodes. As it can be seen from eq. 3, capacitance is dependent on both dielectric permittivity of medium surrounding the electrode and the geometry of the electrode. Therefore, accuracy of estimation of mechanical damage in the cured coat via capacitance measurements relies on compensation of environmental impact on the dielectric permittivity of coating system. This is typically achieved by ambient T and RH readings.

Overall, evaluation of crack propagation from the capacitive electrode can be considered as more difficult due to its sensitivity to variations in the environment, however the advantage of this method is that it provides information not only about the electrode, but also about the cured coat.

Examples of resistance and capacitance electrodes that can be used to detect cracks in the cured coat is shown in FIGS. 10 and 11. The main differentiation between resistance and capacitance electrodes is that the former type is made of continuous electrode(s), while latter has electrodes that spatially separated. The size and layout of electrodes can vary. FIG. 10a illustrates a type 1 electrode for resistance sensing, and FIG. 10b illustrates a type 2 electrode for resistance sensing. FIG. 11a illustrates a type 1 electrode for capacitance sensing, and FIG. 11b illustrates a type 2 electrode for capacitance sensing.

Table 2, below illustrates advantages and disadvantages of simplified and multielectrode resistance and capacitance electrodes.

TABLE 2

Figure 11C:
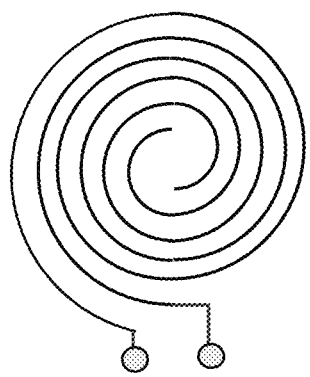
Figure 12:
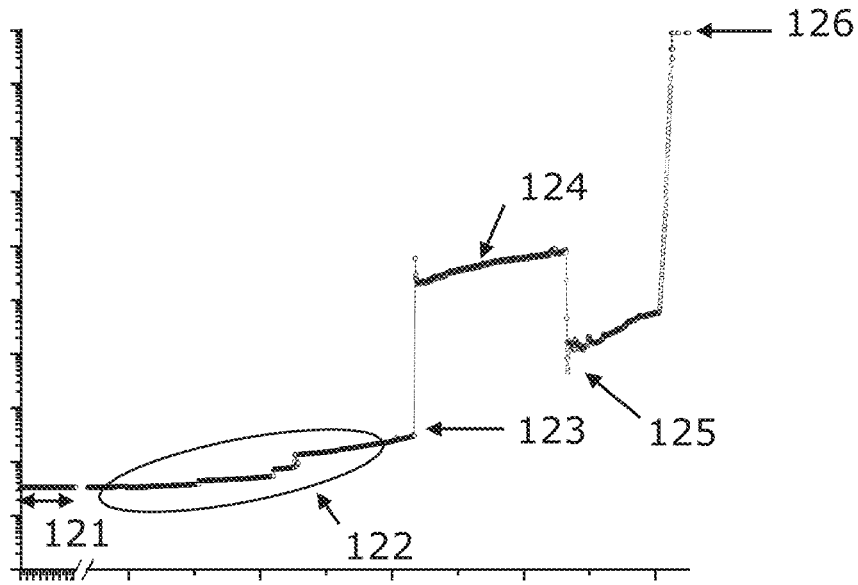
FIG. 12 illustrates a signal in a resistance based electrode for crack detection.

| Resistance, FIG. 11 | | Capacitance, FIG. 12 | |
|---|---|---|---|
| Type 1, FIG. 10a | Type 2, FIG. 10b | Type 1, FIG. 11a | Type 2, FIG. 11b |
| Easy to cover larger distances | For the same distance, covers larger surface area | Easy to apply by printing or transfer method | Small distance between electrodes can confine detection volume to within the cured coat -no effect from surface |
| Easy to read | Will be able to measure longer i.e. will require damage of conductors in several places before stops working | Simple design allows application in difficult areas | Not only the crack at initial stage, but also the consequent corrosion of the base can be detected |
| Simple design allows application in difficult areas | Accuracy of the design more prone to variations in resistance of the ink over time due to temperature and corrosion | Impedance measurement provides information on the cured coat properties prior to the damage by the crack | More complex system, requires evaluation of multiple factors |
| Works more like fuse, as it is comprised of single electrode, when that gets broken, the electrode is out of use | | Due to large distance between conductors, the detection volume might extend above the top surface of the | |

TABLE 2-continued

| Resistance, FIG. 11 | | Capacitance, FIG. 12 | |
|---|---|---|---|
| Type 1, FIG. 10a | Type 2, FIG. 10b | Type 1, FIG. 11a | Type 2, FIG. 11b |
| | | cured coat thereby be sensitive to contact with liquid water | |

Figure 10C:
FIGS. 10 and 11 illustrate examples of resistance-based electrodes, FIGS. 10a to 10e, and capacitance-based electrodes, FIGS. 11a to 11c, for crack detection.
Figure 10D:
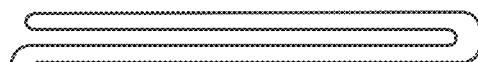
Figure 10E:
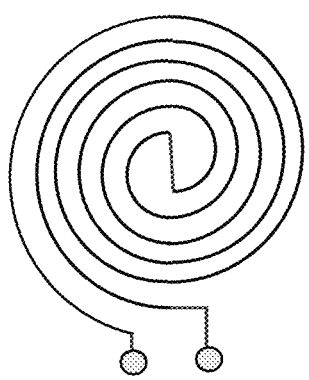

FIGS. 10c-e illustrates electrodes essentially like the electrode in FIG. 10a but with various shapes allowing covering of a larger area.

FIG. 11c illustrates a two-electrode system essentially like the electrode in FIG. 11b but with various shapes allowing covering of a larger area.

Figure 13:
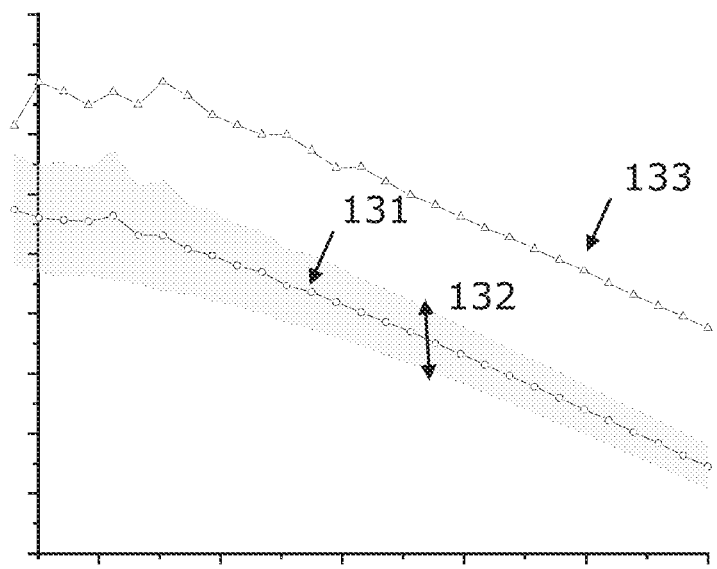
FIG. 13 illustrates a signal in a capacitance based electrode for crack detection.

The two graphs in FIGS. 12, 13 illustrate an example of measurements obtainable on resistance-based electrodes, FIG. 12, and capacitance-based electrodes, FIG. 13.

In FIG. 12, related to resistance-based electrodes, the abscissa indicates time in hours, and the ordinate indicates $|Z|_{Hz}$ in Ohm. The resistance change can occur due to changes in specific resistance of the ink e.g. post sintering or ageing effects, also as response to changing environmental conditions, and due to a change of electrode geometry (cracking). In case of severe damage and loss of electrode continuity, the measurement will be carried out in an open circuit.

In FIG. 12 illustrates a resistance-based electrode response over time as a results of crack propagation. The abscissa illustrates duration in hours, and the ordinate illustrates Resistance of the electrode shown in logarithmic scale. 121 points at an initial lifetime prior to crack initiation (only slight fluctuation in value as response to ambient environment), 122 points at a point in time where a crack initiates and progresses through the electrode, it results in increase of resistance due to reduction in continuity of conductors. 123 and 124 shows abrupt and steady increase of resistance, both are due to decrease in continuity of conductors as part of electrode. At 125—Partial recovery of resistance can be due to volumetric shrinkage resulting in intermittent partial restore of electrode continuity.

At 126, the electrode is completely broken which indicates severe damage of the coating, and the electrode can't be is used after this point.

FIG. 13 illustrates detection of crack propagation from change of capacitance via EIS measurement. The abscissa indicates logarithm of frequency in Hz, and the ordinate indicates logarithm of impedance modulus in Ohm. 131 points at an exemplary EIS spectrum of intact embedded electrode, 132 points at a variation of EIS response due to environmental impact and/or slightly changed electrode geometry due to crack propagation. 133 points at a significant increase in impedance that correspondingly can be seen as a decrease of capacitance measurable at an open circuit when electrode continuity is broken.

Figure 14:
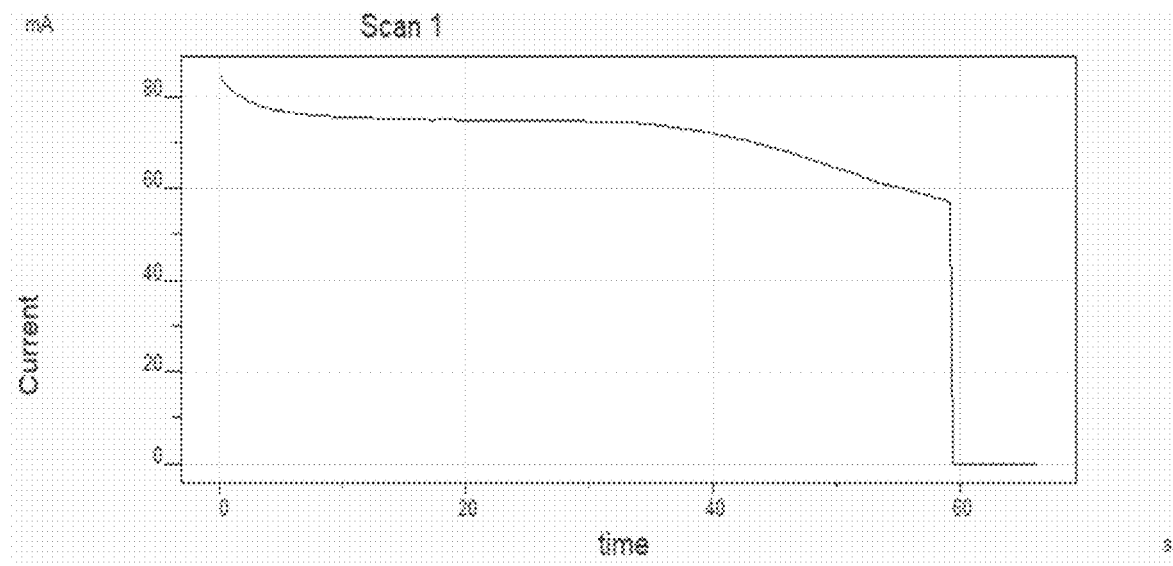
FIG. 14 illustrates measurement of elongation until breaking in the form of a current through the electrode.

FIG. 14 illustrates measurement of elongation until breaking in the form of a current through the electrode. At time=60, the electrode breaks and the current drops to zero.

Figure 15:
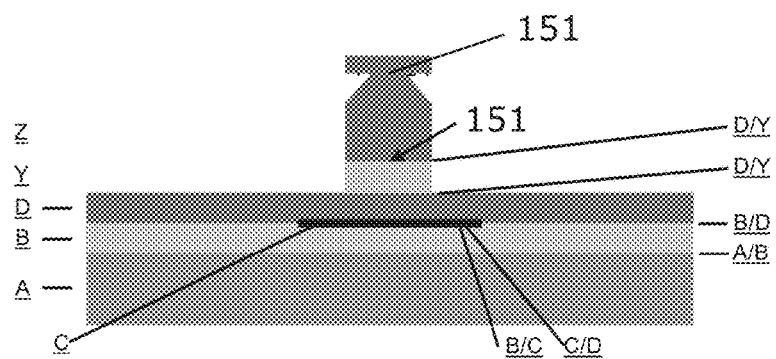
FIG. 15 illustrates principles of measuring cohesive fracture and adhesive fracture.

FIG. 15 illustrates principles of measuring cohesive fracture and adhesive fracture. The Layer A is the base, e.g. a plate of steel. B and D are two adjacent layers of coating, and C is an electrode embedded between the two layers. The dolly Z is glued to the outer surface of the cured coat at the interface Y, i.e. to the upper surface of coating layer B. The dolly is pulled off when the glue is dried.

B/D indicates the cohesive strength between layer B and D. A/B indicates the cohesive strength between the base and the layer B. B/C indicates the cohesive strength between layer B and the electrode C, and C/D indicates the cohesive strength between the electrode C and the layer D.

Figure 16:
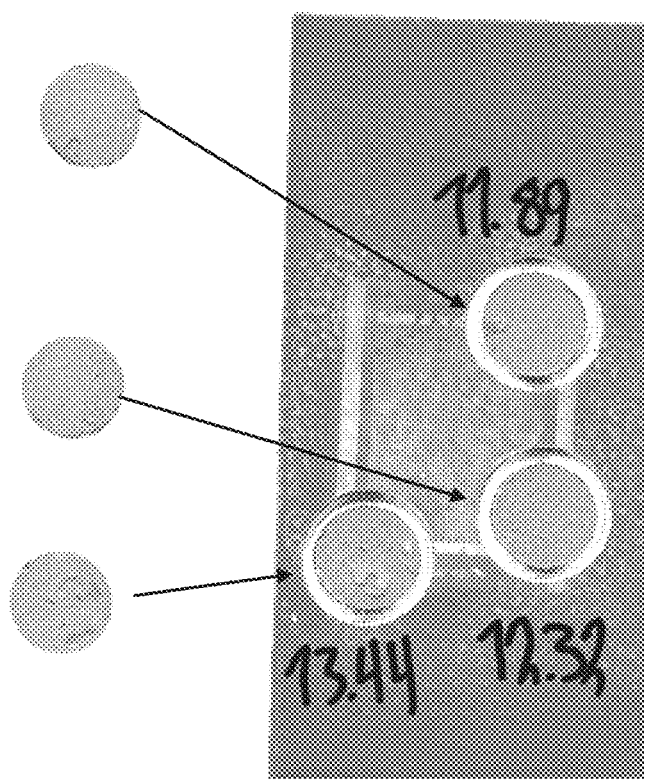
FIG. 16 illustrates cohesive failure of the coating after pull-off test.
Figure 17:
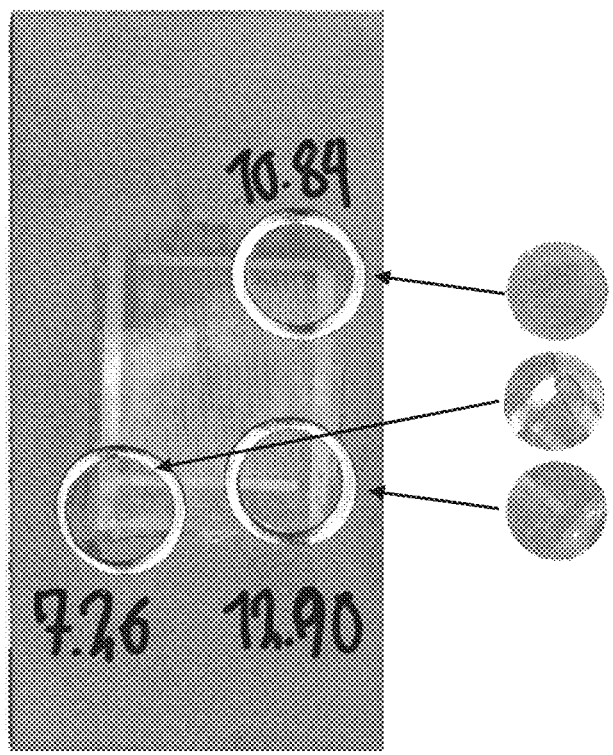
FIG. 17 illustrates a combination of cohesive failure of the coating, cohesive failure of the electrodes, and adhesive failure at the coating-electrode and coating-coating interface.

FIGS. 16 and 17 illustrate pictures of the substrate after the dolly is pulled off. FIG. 16 shows a cohesive failure of the coating, while FIG. 17 shows a combination of cohesive and adhesive failure of the coating and the electrode. These results were obtained with two different coatings, however, overall failure interfaces i.e. in one case a cohesive coating failure and in another a combination of several failure modes, together with high pull off values (expressed in MPa as written on the panels) indicate good compatibility between the coating and the electrode material, as applied by transfer method.

Determining the Flexibility of the Electrode Material and the Cured Coat:

Different types of tests are used routinely in the coatings industry to determine the flexibility and impact resistance of organic coatings. A combination of these tests could be used to determine the mechanical properties of the coating system and the electrode material.

Typical tests are described in NACE TM0404-2004, sections 9, 12 and 13. Section 9 is a thermal cycling resistance test where coated panels are subject to an upper temperature of 60 C and a lower temperature of −30 C with two hours per cycle. The test is run continuously for 21 days or 252 cycles. At the end of the test the samples are viewed with a 30× microscope for cracking.

NACE TM0404-2004, Section 12 describes testing flexibility according to ASTM D522. The bare face of the test specimen shall be bent over the fixed-radius steel mandrel. The deformed coating surface shall be examined for signs of cracking using a stereo microscope and a low-voltage holiday detector. If no cracking is detected, the test specimen shall be bent over a mandrel with a smaller radius. The process shall be repeated until cracking is detected.

NACE TM0404-2004, Section 13 tests the impact resistance according to ASTM D2794.

Dynamic mechanical analysis of electrode material can be implemented as part of standardized methods for evaluation of coatings as mentioned above.

Experiment 1, Elongation Testing

Tensile tests were carried out simultaneously with chronoamperometry measurements which were taken in situ on the sample during tensile elongation. In this test, electrodes applied on a transfer foil were placed in a tensile tester and at each end of the electrode a cable to a potentiostat were connected for measuring chronoamperometry continuous during the tensile test. The chronoamperometry enables monitoring of the current, hence, the resistance of the electrode material during the increasing elongation and will show at what elongation the electrode is working. The electrodes applied on the transfer foil where elongated and by use of chronoamperometry, the elongation was determined until rupture of the foil or until the current in chronoamperometry increases to a level associated with failure of the electrode material, i.e. rupture of the electrode. These tests included two different electrodes, one referred to as "transfer electrode" and one referred to as "NanoInk" electrode.

The transfer electrode was functional until the transfer foil broke, and the elongation testing thereby expresses an elongation at break value that is lower than the actual value as it is the elongation at break of the underlying transfer foil that is limiting and not the transfer electrode. Hence, the value reported for the transfer electrode is thus the minimum known elongation at break but not the actual value which is higher.

Both electrode types are silver based and have silver as their electrical conductive material in different nanostructures/microstructures. The NanoInk electrode comprises fused/sintered silver nanoparticles which provides a high porosity whereas the transfer electrode comprises long silver nanofibers giving a less porous structure and should enable the fibres to slide along each other during elongation but still maintain conductivity. The thicknesses of the two electrode materials are in the same order of magnitude, however, the NanoInk electrode is a little thicker than the transfer electrode. The transfer electrode thickness range is approximately 0.3-2.5 μm whereas for the NanoInk electrode the range is approximately 3-10 μm. The slight thickness differences are not expected to induce significant differences which mostly will be a result of the different nanostructures/microstructures of the two materials.

FIG. 14 illustrates measurement of elongation until breaking in the form of a current through the electrode at a fixed potential as a function of time, until the transfer foil and electrode breaks.

For the transfer electrode, elongation of more than 113 percent did not break the electrode but broke the underlying foil, hence, a high elongation value could not be documented even as the actual value is higher as previously described. For the NanoInk electrode, elongation of 10-15 percent did break the electrode by rendering it non-conductive at these elongation levels. Such elongation levels are higher than elongation at breakage for a typical coating. Accordingly, such electrodes could be embedded in a coating and remain functional until the coating breaks since it is more elastically deformable than the coating.

Experiment 2, Evaluating the Adhesion Between the Electrode and Coating Layers

The experiment was carried out by coating test panels with one layer and two layers of cured coat, respectively. An electrode is placed on top of the first layer and then either left on top or overcoated by a second layer.

The test was carried out by use of two commercially available bisphenol A based epoxy coating systems, referred to as 17410 (Hempel coating: Hempadur Fast Dry) and 17720 (Hempel coating: Hempadur Quattro XO).

To evaluate the adhesion performance, a so-called dolly, i.e. a metal cylinder with fixture for fixation of test equipment, was attached adhesively by glue to the cured coating. The electrode was embedded between layer one and layer two or coating+electrode (electrode on top of one layer of cured coat but still with accessible coating surface) by use of glue and subsequently pulled off by force from standardised test equipment. During this process, the test illustrates the weakest part of the test specimen, and thereby shows whether it is an adhesive or cohesive failure. Accordingly, the test illustrates if the electrode would be able to adhere sufficiently strong to the coating to enable stress and crack from the coating to migrate to the electrode for subsequent detection.

Tables 3 and 4 below illustrate an overview of pull-off tests carried out for evaluation of adhesion according to ISO4624, Coating 17410

TABLE 3

| Panel # | Sensor type | L2? | Adhesion avg | Adhesion stdv |
|---|---|---|---|---|
| 1 | Transfer | Yes | 15.4 | 1.1 |
| 3 | Transfer | Yes | 10.8 | 2.2 |
| 2 | Transfer | No | 12.6 | 0.8 |
| 4 | Transfer | No | 11.8 | 0.8 |
| 5 | NanoInk | Yes | 16.3 | 1.6 |
| 7 | NanoInk | Yes | 14.3 | 1.0 |
| 6 | NanoInk | No | 7.0 | 0.0 |
| 8 | NanoInk | No | 7.7 | 1.2 |

TABLE 4

| Panel # | Fracture 1 (total) | Fracture 2 (total) | Fracture 3 (total) | Fracture 1 (sensor) | Fracture 2 (sensor) | Fracture 3 (sensor) |
|---|---|---|---|---|---|---|
| 1 | 30% D/Y, 55% B, 15% B/C | 10% B/C, 30% D, 60% B | 70% D/Y, 15% C, 15% B | 30% B/C, 70% B | 65% B/C, 35% B | 30% C, 30% B, 40% D/Y |
| 3 | 45% D/Y, 30% B, 25% B/C | 70% D/Y, 30% B | 70% D/Y, 30% B | 40% B/C, 50% D/Y, 10% B | 70% D/Y, 30% B | 70% D/Y, 30% B |
| 2 | 80% B, 15% D, 5% C | 95% B, 5% D | 95% B, 5% C | 90% B, 10% C | 100% B | 80% B, 20% C |
| 4 | 70% B, 30% C/D | 90% B, 10% C/D | 90% B, 10% C | 5% B/C, 20% C, 75% B | 15% C/D, 85% B | 15% C, 85% B |
| 5 | 50% D/Y, 30% D, 20% C | 90% D/Y, 5% B, 5% C | 70% D/Y, 15% D, 15% C | 100% C | 100% C | 50% C, 50% D/Y |
| 7 | 10% D/Y, 35% D, 55% C | 50% D, 50% C | 30% D/Y, 45% D, 25% C | 70% C, 30% D | 70% C, 30% D | 60% C, 40% D |
| 6 | 25% B, 25% D/Y, 50% C | 50% C, 20% B, 30% D/Y | 60% C, 25% B, 15% D/Y | 100% C | 100% C | 100% C |

TABLE 4-continued

| Panel # | Fracture 1 (total) | Fracture 2 (total) | Fracture 3 (total) | Fracture 1 (sensor) | Fracture 2 (sensor) | Fracture 3 (sensor) |
|---|---|---|---|---|---|---|
| 8 | 15% B, 35% C, 50% D/Y | 10% B, 30% D/Y, 60% C | 50% B, 30% C, 20% D/Y | 50% C, 50% D/Y | 60% C, 40% D/Y | 50% C, 50% D/Y |

Tables 5 and 6 provide an overview of pull-off test for adhesion according to ISO4624, Coating 17720

TABLE 5

| Panel # | Sensor type | L2? | Adhesion avg | Adhesion stdv |
|---|---|---|---|---|
| 14 | Transfer | Yes | 10.5 | 0.7 |
| 16 | Transfer | Yes | 11.8 | 1.4 |
| 13 | Transfer | No | 10.3 | 2.9 |
| 15 | Transfer | No | 12.5 | 0.3 |
| 10 | NanoInk | Yes | 7.9 | 2.4 |
| 12 | NanoInk | Yes | 8.3 | 1.4 |
| 9 | NanoInk | No | 8.1 | 0.4 |
| 11 | NanoInk | No | 4.9 | 1.4 |

TABLE 6

| Panel # | Fracture 1 (total) | Fracture 2 (total) | Fracture 3 (total) | Fracture 1 (sensor) | Fracture 2 (sensor) | Fracture 3 (sensor) |
|---|---|---|---|---|---|---|
| 14 | 100% D/Y | 95% D/Y, 5% C/D | 100% D/Y | 100% D/Y | 90% D/Y, 10% C/D | 100% D/Y |
| 16 | 95% D/Y, 5% B/C | 100% D/Y | 95% D/Y, 5% C | 90% D/Y, 10% B/C | 100% D/Y | 90% D/Y, 10% C |
| 13 | 40% D/Y, 35% B, 25% C | 10% C, 60% B, 30% D/Y | 75% D/Y, 15% D, 10% C | 60% C, 40% D/Y | 90% D/Y, 10% C | 10% C, 90% D/Y |
| 15 | 70% B, 15% C, 15% D/Y | 60% B, 5% B/Y, 35% D/Y | 60% D/Y, 10% C, 30% B | 50% C, 50% D/Y | 90% D/Y, 10% C | 15% C, 85% D/Y |
| 10 | 60% C, 30% D/Y | 60% C, 30% D/Y | 15% D/Y, 30% D, 55% C | 100% C | 100% C | 100% C |
| 12 | 60% C, 30% D/Y | 60% C, 30% D/Y | 60% C, 30% D/Y | 100% C | 100% C | 100% C |
| 9 | 50% D/Y, 20% D, 30% C | 40% D/Y, 15% D, 45% C | 55% D/Y, 15% D, 30% C | 70% C, 30% D/Y | 70% C, 30% D/Y | 60% D/Y, 40% C |
| 11 | 30% D/Y, 20% D, 50% C | 55% D/Y, 45% C | 60% D/Y, 10% D, 30% C | 80% C, 20% D/Y | 50% C, 50% D/Y | 70% D/Y, 30% C |

Tables 3, 4, 5, and 6 illustrate adhesion data for the testing, and FIGS. 16 and 17 illustrate the dolly and test sample after the dolly was pulled off.

The tables are read as follows; column 1 (panel #) refers to an arbitrary number of the specific panel/sample tested, column 2 (electrode type) refers to the type of electrode used, column 3 (L2) refers to whether or not there is a second coating layer and this if the electrode is embedded or on the surface of the coating, Column 4 (adhesion avg) shows the average pull-off force measured for the three dollys on each sample, column 5 (adhesion stdv) shows the standard deviation for the pull-off force, column 5-7 (fracture #(total)) shows the fracture evaluation for the entire area under the dolly, and column 8-10 (fracture #(electrode)) shows the fracture evaluation isolated only to the area under the dolly that is occupied by the electrode, hence, excluding area with only coating and not electrode.

Slightly different results are observed between the two electrode types. For the NanoInk electrode it is observed that within the electrode area (column 8-10) full cohesive failure of the electrode material takes place. Looking at the entire dolly area, some degree of cohesive failure in coating layer 1 is observed because the cohesive force of the electrodes is low enough to ensure that at the end of the test it is the paint area that keeps the dolly attached and finally fails when the force per area becomes too high. The pull-off force is significantly lower compared to the other 17410 samples as the weak cohesive strength of the electrode which takes up much of the dolly area, lowers the force needed to pull-off the dolly. This result shows that the adhesive force between the electrode and coating is good but that the weakest point of the system is the cohesive force of the electrode material itself. For the transfer electrode a different type of failure is observed by having full cohesive failure in the coating also at the areas with electrode. This indicates that the adhesive force between electrode and coating and the cohesive force of the electrode is not the limiting factor, however, the cohesive force of the coating is the limiting factor. This shows that the transfer electrode has very high adhesion to the coating and in itself is a strong material.

For the 17410, two layer samples, the failure mechanism is similar to that of the one layers system. For the NanoInk electrode cohesive failure is observed within the electrode material showing electrode material left on both the panel and the dolly. As before cohesive failure in the coating is also seen in the area with no electrode following the previously given explanation. Thus, the adhesion to the coating is good but the internal cohesive strength of the electrodes is rather week. For the transfer electrode full cohesive failure in the paint is again seen with less than 5% adhesive failure meaning that the cohesive strength of the coating is the weakest point. This means that the adhesive strength to the coating and the cohesive strength of the electrode is very high. The adhesive failure between the electrode and coating was estimated to less than 5 percent, and the testing was carried out according to the ISO_4624_2016 standard.

For the 17720, one layer sample, the failure data is a bit more mixed. For the NanoInk electrode again 100% cohesive failure is seen in the electrode material and only with coating cohesive failure in the area with no electrode on top. Again, showing an acceptable adhesive strength between the electrode and the coating but less optimal cohesive strength of the electrode material. For the transfer electrode, cohesive coating failure is seen in the areas where no electrode is presented under the dolly. However, in the electrode areas, a combination of adhesive failure to the glue and less cohesive failure in the electrode is seen. The adhesive failure towards the glue can be understood as the adhesive force of the electrode to the glue is lower than that towards the coating, still confirming good adhesion between the electrode and the coating. A minor part of the electrode breaks cohesively, this is because the overall pull-off force needed for the sample is rather high and some areas of the electrode that potentially have some structural "defects" alter those areas weaker than the rest of the electrode. This shows that the transfer electrode adheres well to the coating and has a high cohesive force.

17720 Two-Layer Samples

Even with minor differences between the results from the two epoxy coatings the results for the two types of electrode materials can be summed up into one coherent conclusion, as follows;

Transfer electrode: the electrode shows high to very high adhesion force towards the tested epoxy coatings and will in all cases be sufficient to ensure proper detection of cracks in the coatings. The cohesive strength of the electrode material appears to be at minimum equally strong as the coating material, hence, no risk of cohesive failure under certain aggressive coating conditions.

NanoInk electrode: the electrode generally shows a relatively low cohesive force which is in line with the nano structure of the material. With regard to the adhesive force towards the coating no adhesive failure is seen but due to the cohesive electrode failure. The exact level of adhesive strength cannot be stated but it can be said that the adhesive force is in the order of minimum several MPa as seen from the pull-off strength in column 4. The adhesive force should ensure that the material is suitable for detecting cracks in the coating, but the lower cohesive force could potentially offer challenges under very special conditions.

Experiment 3, Corrosion Under Insulation (CUI) Testing

In this test, two type of electrodes, resistance based electrodes (FIG. 10b) and capacitance based electrodes (FIG. 11b), were embedded between two cured layers of the same coating by use of transfer technique. Both electrodes were embedded side by side on the same test panel. The thickness of each layer of the coating was (150±20) μm.

A glass cell 181 with a diameter of 110 mm (4.3 inches) and height of 245 mm (9.6 inches) was mounted on top of the test panel 182 using silicone sealant to create a cell for test environment. Electrodes 183 where embedded in the test panel.

Inside the glass cell, the entire surface of the test panel was covered with mineral wool 184 from "Rockwool", which was pre-cut to fit tightly inside the glass cell. The thickness of the insulation was 45 mm (1.8 inches). The test panel was placed on a hot plate 185 which was used to create cycling CUI conditions. FIG. 18 shows a visualization of the test setup.

The test was performed using the test conditions adapted in ASTM G189-07 (reference: "STM G189-07(2021)e1, Standard Guide for Laboratory Simulation of Corrosion Under Insulation," West Conshohocken, PA, 2021). The environment was cycled between 60° C. (140° F.) wet for 4 h and 150° C. (572° F.) dry for 20 h. The wet conditions inside the glass cell were established by injecting 30 ml (1 floz) of deionised water into the thermal insulation. As according to the standard, the period of one cycle is 24 h, and the total of number of test cycles is 21.

During the test, the impedance of the two types of electrodes was monitored continuously. The response of both electrodes was initially obtained as impedance spectra in the range between 100 kHz and 0.1 Hz, similar to FIG. 13, however, for representation purpose, the response signals were expressed as resistance for the resistance-based electrodes (FIG. 10b) and capacitance for the capacitance-based electrodes (FIG. 11b). Time response of both electrodes, accordingly, can be seen in FIGS. 19 and 20.

Evaluation of the resistance and capacitance graphs over time in FIGS. 19 and 20, reveals the response of the electrodes and the coating to the cycling changes of environmental conditions i.e. increase of resistance with increase of temperature in case of the response illustrated in FIG. 19, and increase of capacitance with humidification of the coating and increase of temperature in case of the response illustrated in FIG. 20.

Variation of resistance and capacitance between constant levels as response to change of environmental conditions is normal, and if consistent, corresponds to reproducible phenomena taking place in the coating with embedded electrode. However, in case of crack development in the coating, this would manifest in response curves as a significant increase or resistance and a drop of capacitance. The timing of these events can be identified accordingly in the graphs, and are marked by the arrows, at approximate time mark of 260 h in FIG. 19, and at the approximate time mark of 672 h in FIG. 20.

The difference between resistance and capacitance electrodes is due to the fact, that the electrodes are in two different locations, and they detect different cracks taking place at a different time, however, on the same test panel.

The development of coating crack on the test panel was further confirmed by visual inspection at the end of 21 cycle (FIG. 21). Two large cracks in mm and cm range were identified along with several smaller sub mm cracks. Creep of corrosion products from under the larger cracks was also visible.

The invention claimed is:

1. A coated structure with a monitoring system, the coated structure comprising a base having a base surface, a coating system comprising two or more layers of cured coat providing protection against surface degradation and being joined to the base surface in a base interface and extending in a thickness direction to an outer coating surface, at least one electrode made from a conductive material embedded in the coating system, and the monitoring system being configured to generate an input signal in the at least one electrode and to read an output signal from the at least one electrode, and from the output signal, to determine cracking of the two or more layers of cured coat, wherein the coating system comprises at least the two layers of cured coat joined in a coating interface and forming an adhesive inter coating bond strength, and wherein at least one of the at least one electrode is located in the coating interface and forms an adhesive electrode bond strength to both layers of cured coat, and wherein the adhesive electrode bond strength is higher or equivalent to the coating bond strength between the at least two layers of cured coat.

2. The coated structure according to claim 1,
wherein said cured coat has been obtained by at least two applications of the same coating composition
wherein one or more electrodes are embedded in between the at least two applications of the same coating composition.

3. The coating structure according to claim 1, wherein the adhesive electrode bond strength is lower or equivalent to a base bond strength between the base and the cured coat closest to the base.

4. The coated structure according to claim 1, wherein the at least two layers of cured coat are obtained from the same coating composition.

5. The coated structure according to claim 1, wherein the at least two layers of cured coat are obtained from different coating compositions.

6. The coated structure according to claim 1, wherein the cured coat bonded to the electrode exhibits a first elongation at break, and the electrode exhibits a second elongation at break,
wherein the first and second elongation at break are essentially equal such that the electrode is configured to break essentially simultaneously with the cured coat during elongation of the base.

7. The coated structure according to claim 1, wherein the cured coat bonded to the electrode exhibits a first elongation at break, and the electrode exhibits a second elongation at break,
wherein the first elongation at break is at most in the order of the second elongation at break such that the electrode is configured to break at the earliest simultaneously with the cured coat during elongation of the base.

8. The coated structure according to claim 1, wherein the cured coat has a temperature expansion which is lower than the elongation at break of the electrode.

9. The coated structure according to claim 1, wherein the conductive material has a thermal expansion coefficient being essentially equal to the thermal expansion coefficient of at least one of said two or more layers of cured coat.

10. The coated structure according to claim 1, wherein the conductive material comprises a conductive flexible polymer or polymer blend such as for example poly(3,4-ethylenedioxythiophene) polystyrene sulfonate (PEDOT:PSS), Polypyrrole (PPy), polyphenylene vinylene (PPV), polyacetylene, or Polyaniline (PANI).

11. The coated structure according to claim 1, wherein the conductive material comprises a non-conductive flexible polymer or polymer blend comprising a conductive dopant.

12. The coated structure according to claim 11, wherein the dopant comprises a metal such as silver, copper, aluminium, iron or zinc.

13. The coated structure according to claim 11, wherein the dopant comprises elements from the carbon family such as graphene, graphite, or carbon nanotubes.

14. The coated structure according to claim 1, wherein one of the at least one electrode forms a plurality of conductors extending individually between two connectors, and
wherein a total resistance between the connectors is calculated based on a contribution from each conductor.

15. The coated structure according to claim 1, wherein the at least one electrode is bonded completely to the cured coat.

16. A method of detecting cracking in a cured coat covering a surface of a base, the method comprising:
embedding at least one electrode in a cured coat and/or between two or more layers of cured coat;
generating an input signal in the at least one electrode; and
using a monitoring system to read an output signal from the at least one electrode and based thereon to determine cracking of the cured coat,
wherein the at least one electrode is designed to break at the earliest simultaneously with said two or more layers cured coat during elongation of the coated structure,
wherein the coating system comprises at least the two layers of cured coat joined in a coating interface and forming an adhesive inter coating bond strength, and
wherein at least one of the at least one electrode is located in the coating interface and forms an adhesive electrode bond strength to both layers of cured coat, and
wherein the adhesive electrode bond strength is higher or equivalent to the coating bond strength between the at least two layers of cured coat.

17. The method according to claim 16, wherein cracking is determined by determining an increased resistance caused by at least partial destruction of the at least one electrode.

18. The method according to claim 16, wherein said coating system comprises at least two electrodes,
wherein cracking is determined by determining a changed capacitance between the at least two electrodes.

19. The method according to claim 16, wherein cracking is determined by EIS.

20. A coating system for protecting a base, the coating system comprising two or more layers of cured coat,
wherein an electrode is embedded in at least one of said two or more layers of cured coat or between at least two or more layers of cured coat,
wherein the cured coat bonded to the electrode exhibit a first elongation at break, and the electrode exhibit a second elongation at break,
wherein the first elongation at break is at most equal to the second elongation at break such that the electrode is configured to break at the earliest simultaneously with the cured coat during elongation of the coated structure,
wherein the coating system comprises at least the two layers of cured coat joined in a coating interface and forming an adhesive inter coating bond strength, and
wherein at least one of the at least one electrode is located in the coating interface and forms an adhesive electrode bond strength to both layers of cured coat, and
wherein the adhesive electrode bond strength is higher or equivalent to the coating bond strength between the at least two layers of cured coat.

21. The coating system according to claim 20, wherein said coating system comprises two or more layers of cured coat, wherein
a) an electrode is embedded in at least one of the two or more layers of cured coat, wherein the cured coat in which the electrode is embedded exhibits a third elongation at break, and the electrode embedded in the at least one of the two or more layers of cured coat exhibits a fourth elongation at break, wherein the third and fourth elongation at break are essentially equal such that the electrode embedded in the at least one of the two or more layers of cured coat is configured to break essentially simultaneously with or at the earliest simultaneously with the cured coat during elongation of the coated structure, and/or b) an electrode is embedded between at least two of the two or more layers of cured coat, wherein at least one of the two or more layers of cured coat exhibits a fifth elongation at break, and the electrode embedded between at least two of the two or more layers of cured coat exhibits a sixth elongation at break, wherein the fifth and sixth elongation at break are essentially equal such that the electrode embedded between at least two of the two or more layers of cured coat is configured to break essentially simultaneously with or at the earliest simultaneously with at least one of the cured coat during elongation of the coated structure.

22. The coating system according to claim 20, comprising a plurality of different layers of cured coat and a plurality of different types of electrodes, each layer of cured coat having an associated type of electrode such that the associated electrode when embedded in or between the two or more layers of cured coat breaks essentially simultaneously with or at the earliest simultaneously with the cured coat during elongation of the coated structure.

* * * * *